United States Patent [19]

Khoe

[11] Patent Number: 5,003,625
[45] Date of Patent: Mar. 26, 1991

[54] OPTICAL HETERODYNE DETECTION AND INTEGRATED OPTICAL COMPONENT SUITABLE FOR USE IN SUCH A DEVICE

[75] Inventor: Giok D. Khoe, Eindhoven, Netherlands

[73] Assignee: U.S. Philips Corporation, New York, N.Y.

[21] Appl. No.: 365,071

[22] Filed: Jun. 12, 1989

[30] Foreign Application Priority Data

Jun. 10, 1988 [NL] Netherlands .................. 8801490

[51] Int. Cl.[5] .............................................. H04B 10/06
[52] U.S. Cl. ..................................... 455/619; 350/172
[58] Field of Search ................ 455/616, 619, 612; 370/2, 3; 350/170, 171, 172, 398

[56] References Cited

U.S. PATENT DOCUMENTS 4,723,315  2/1988  Wetherell ............................ 455/619

FOREIGN PATENT DOCUMENTS

| 0251062 | 1/1988 | European Pat. Off. . | |
|---|---|---|---|
| 0149025 | 9/1983 | Japan | 455/619 |
| 0047524 | 3/1985 | Japan | 455/619 |
| 0190138 | 7/1989 | Japan | 455/616 |
| 2172766 | 9/1986 | United Kingdom | 455/619 |
| 8501590 | 4/1985 | World Int. Prop. O. . | |

OTHER PUBLICATIONS

O. E. DeLange, "Optical Heterodyne Detection", IEEE Spectrum (Oct. 1968) pp. 77-85 (relevance explained in specification).

*Primary Examiner*—Joseph A. Orsino
*Assistant Examiner*—L. Van Beek
*Attorney, Agent, or Firm*—Anne E. Barschall; Leroy Eason

[57] ABSTRACT

An optical heterodyne or homodyne receiver includes a single constructively integrated optical component which combines a local oscillator beam with a signal beam to derive oppositely phased combined beams and further splits each of the combined beams into orthogonally polarized sub-beams. The integrated optical component has a polarization-sensitive beam-splitting layer in a first plane and a polarization-insensitive beam-splitting layer in a second plane, the two planes being perpendicular or parallel to each other.

22 Claims, 5 Drawing Sheets

OPTICAL HETERODYNE DETECTION AND INTEGRATED OPTICAL COMPONENT SUITABLE FOR USE IN SUCH A DEVICE

BACKGROUND OF THE INVENTION

1. Field of the Invention

The invention relates to a receiver for optical heterodyne or homodyne detection of an optical signal beam, which receiver comprises: a local oscillator for producing a beam of radiation at least one polarization-sensitive beam splitter for splitting the signal beam into two orthogonally polarized components, at least one polarization-insensitive beam-combining element for combining radiation from the signal beam with radiation from the local oscillator beam, and a detection system for converting the combined radiation into at least one electric signal suitable for further processing.

2. Description of the Related Art

Receivers for optical heterodyne detection are used in optical signal transmission. By mixing the signal beam in a heterodyne detector with an optical beam emitted by a local oscillator, a considerably better result is obtained in signal-to-noise ratio and discrimination of against background radiation as compared with direct detection of the signal beam.

The principle of heterodyne detection of optical radiation is extensively described in the Article "Optical Heterodyne Detection" by O. E. DeLange in the journal "IEEE Spectrum" of Oct. 1968, pp. 77–85. As has been stated in this Article, it is important that the states of polarization of the signal beam and the local oscillator beam correspond as closely as possible. A possible solution to achieve this is to split the signal beam into two sub-beams having mutually perpendicular and fixed directions of polarization. The two sub-beams are then each combined with local oscillator radiation which is polarized in the same direction.

In principle, four components are required for splitting and combining the beams: two polarization-sensitive beam splitters for splitting the signal beam and the local oscillator beam, respectively, and two polarization-insensitive beam-combining elements for combining the sub-beams formed.

By firstly combining the signal beam with the local oscillator beam and subsequently splitting it by means of a polarization-sensitive beam splitter into two orthogonally polarized sub-beams, one of the beam-combining elements can be dispensed with. Since a beam-combining element not only has two inputs but necessarily also two outputs, two polarization-sensitive beam splitters remain necessary to absorb and detect all signal radiation.

The beam-combining element used in practice in a heterodyne receiver is a fibre-optic polarization-maintaining directional coupler. Such a coupler comprises two optical waveguides which run parallel at a short distance from each other over a length of approximately five centimeters. Both ends of each waveguide are coupled to an optical fibre having a length of several dozen centimeters, the so-called pigtails. The ends of the pigtails are coupled to further optical fibres for applying the signal beam and the local oscillator beam and for further guiding the combined beams to the detection system. Such a system requires a fairly large space, not only because of the required relatively large length of the directional coupler but particularly because of the length of the pigtails. It is true that the latter can be curled but the radius of curvature should not be much less than about ten centimeters so that the linear dimension of the optical part of the heterodyne detector is at least approximately twenty centimeters.

A further drawback of such a system is that losses occur in the couplings between the various optical components and optical waveguides, which couplings thus attenuate the signal to be transmitted.

SUMMARY OF THE INVENTION

It is an object of the invention to provide a novel receiver for optical heterodyne detection which requires only little space and in which fewer optical losses occur.

To this end a receiver according to the invention is characterized in that the said polarization-sensitive beam splitter and the said polarization-insensitive beam-combining element are respecting planar layer of a single constructively integrated optical component. The integrated optical component comprises shorter pigtails so that the size of the detection device is limited. Moreover, there are fewer couplings between the waveguides establishing the connections with the other components so that also the radiation loss due to such couplings is reduced.

A first embodiment of the receiver for optical heterodyne detection according to the invention is characterized in that the integrated optical component has a polarization-sensitive beam-splitting layer in a first plane and a polarization-insensitive beam-splitting layer in a second planes, the first and the second plane extending at substantially right angles to each other. In this first embodiment the incoming signal beam and the local oscillator beam are each split by the beam-splitting layer into two orthogonally polarized sub-beams and subsequently the respective sub-beams of the signal beam are combined with the correspondingly polarized sub-beams of the local oscillator beam.

A second embodiment of the receiver for optical heterodyne detection according to the invention is characterized in that the integrated optical component has a plarization-sensitive beam-splitting layer in a first plane and a polarization-insensitive beam-splitting layer in a second plane, the first and the second plane extending at substantially right angles to each other, said polarization-insensitive beam-splitting layer functioning as a beam-combining element. By presenting the signal beam and the local oscillator beam to the integrated optical component in a different manner, the beams are combined by means of the polarization-insensitive beam splitter and subsequently split into orthogonally polarized sub-beams. Since the incident beams only need to coincide at one point on the plane of the polarization-insensitive beam splitter, alignment of this embodiment is simpler. Moreover, a part of the polarization-insensitive beam splitter can be dispensed with, which provides the possibility of using a simpler and less expensive component.

A third embodiment of the receiver for optical heterodyne detection according to the invention is characterized in that the integrated optical component has two polarization-sensitive beam-splitting layers and one polarization-insensitive beam-splitting layer, the said beam-splitting layers being arranged parallel to one another, said polarization-insensitive beam-splitting layer functioning as a beam-combining element. The optical component has two inputs and four outputs.

Two inputs or outputs are connected to two sides of the component and only one input or output is connected to the other two sides. The advantage of this embodiment is that the sides of the input connections does not comprise any output connections. This provides a greater freedom for aligning the signal beam and the local oscillator beam.

A fourth embodiment of a receives according to the invention is characterized in that the integrated optical component has at least one reflecting face which is arranged in the light path of an entrance or exit radiation beam for deflecting said radiation beam. This provides the possibility of giving the waveguides with which the entrance and exit radiation beams are supplied or removed different positions and orientations without separate measures being required.

This embodiment may be further characterized in that the said reflecting face extends at an angle of approximately 45° to the plane in which the light paths of the radiation beams within the integrated component are arranged.

In this manner the entrance and exit radiation beams can be arranged on the "upper" or "lower side" of the optical component. Preferably, this is further characterized in that at least one reflecting face is arranged in the light path of an entrance beam for deflecting a beam coming from a first direction, in that at least one reflecting face is arranged in the light path of an exit beam for deflecting the exit beam into a second direction and in that the said first and second directions are diametrically opposed directions. This provides the possibility of arranging the entrance radiation beams on the "upper side" and the exit radiation beams on the "lower side" of the optical component. This has the additional advantage that waveguides are no longer required between the optical component and the radiation-sensitive detectors which can be directly arranged on the face of the optical component.

Although being fewer than in the conventional coherent detectors the receiver according to the invention comprises several entrance and exit faces on which reflections occur, inter alia of the optical waveguides and the integrated optical component. That should be prevented as much as possible since such reflections can disturb the signal. This can be achieved, for example, by providing an anti-reflection coating. To reduce the disturbing influence of the remaining reflection on the faces of the integrated optical component to a further extent, the receiver according to the invention is preferably further characterized in that the integrated optical component has at least one reflecting face which is arranged in the light path of an entrance or exit radiation beam for deflecting said radiation beam. Since the entrance and/or exit faces are arranged slightly obliquely with respect to the radiation beam passing therethrough, the radiation reflected on the face is not captured in the optical waveguides and consequently the signal is not disturbed.

Also the entrance or exit faces of the optical waveguides may be arranged obliquely on the optical waveguides for this purpose, as is known from the contribution by C. K. Wong et al., entitled "General purpose single-mode laser package provided with a parallel beam output having −60 dB interface feedback" to the 14th ECOC conference held at Brighton in Sept. 1988, and published on pp. 215-218 in the proceedings of this conference.

BRIEF DESCRIPTION OF THE DRAWINGS

Embodiments of the invention will now be described in greater detail with reference to the accompanying drawings in which.

DESCRIPTION OF THE PREFERRED EMBODIMENTS

Figure 1:
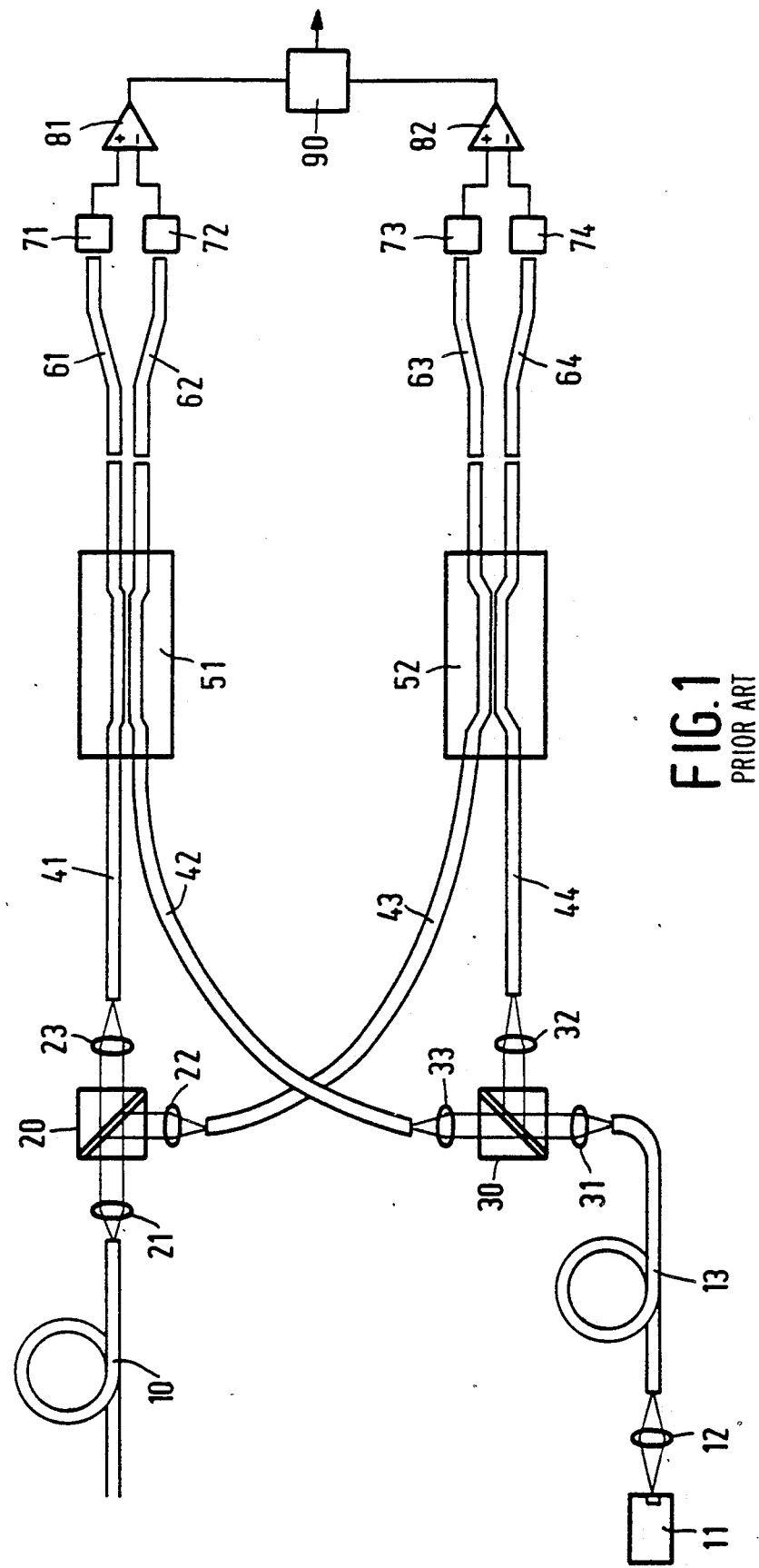
FIGS. 1 and 2 show two receivers for optical heterodyne detection, illustrating the drawbacks which are obviated by using the invention.

FIG. 1 shows diagrammatically a prior form of receiver for optical heterodyne or homodyne detection. A radiation beam from an optical transmission fibre 10 is converted by means of a lens 21 into a parallel beam which is incident on a polarization-sensitive beam splitter 20. In the polarization-sensitive beam splitter 20 the signal beam is split into two linearly polarized sub-beams which are focused via the lenses 22 and 23 on the ends of two optical fibres 41 and 43. The radiation from the one sub-beam is guided via the fibre 41 to an input of a first fibre-optic coupler 51. The radiation from the other sub-beam is guided via the fibre 43 to an input of a second fibre-optic coupler 52. Both fibre-optic couplers have a second input to which linearly polarized radiation from a local oscillator 11 is presented in an analogous manner. The radiation generated in the local oscillator 11 is incident via the lens 12, the fibre 13 and the lens 31 on a seond polarization-sensitive beam splitter 30, which splits the radiation into two linearly polarized components which are applied via the lens 33 and the fibre 42, and the lens 32 and the fibre 44 to the other inputs of the fibre-optic couplers 51 and 52, respectively. In the fibre-optic couplers the radiation from the two inputs is combined and the combined radiation leaves the couplers via the two outputs. The combined sub-beams are further guided to opto-electric converters 71, 72, 73 and 74 via the fibres 61, 62, 63 and 64.

Since the two output signals from a fibre-optic coupler are anti-phase relative to each other, the electric output signals of the two opto-electric converters receiving radiation from a coupler are combined by applying these signals to a differential amplifier. The signals from the converters 71 and 72 are combined in a differential amplifier 81, those from the converters 73 and 74 are combined in a differential amplifier 82. Finally, the output signals from the differential amplifiers 81 and 82 are combined in the circuit 90 whose output is an electric signal which is modulated with the same information as the optical transmission signal which is presented to the device via the transmission fibre 10.

Figure 2:
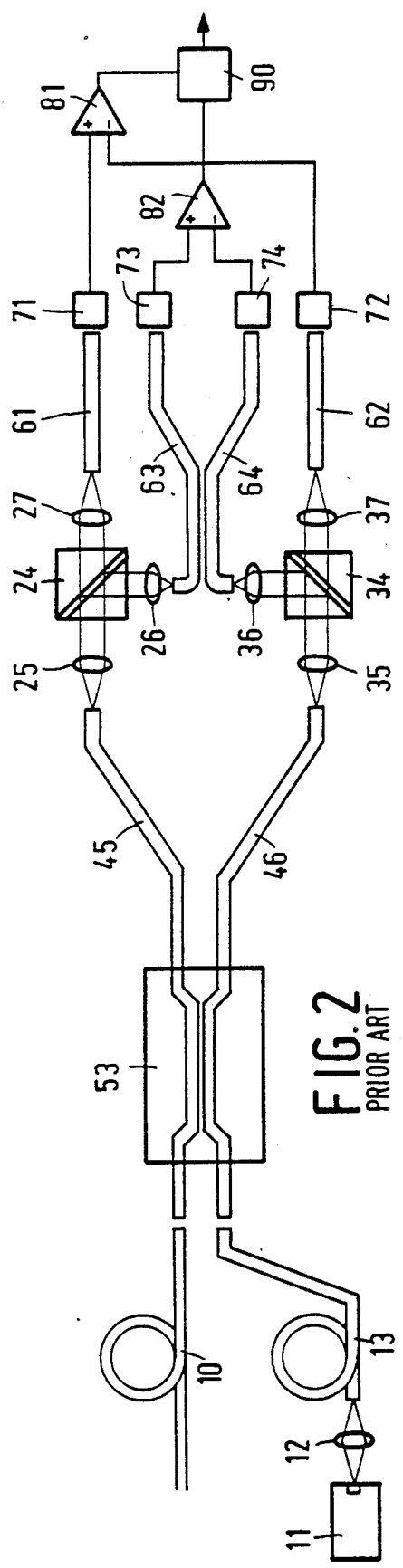

FIG. 2 shows diagrammatically an alternative receiver for optical heterodyne or homodyne detection. The receiver shown partly corresponds to the embodiment shown in FIG. 1. The same elements have identical reference symbols and will therefore not be further discussed.

In FIG. 2 the radiation of the signal beam and the local oscillator beam firstly tranverses the fibre-optic coupler 53 whereafter the two emerging beams with combined radiation are incident on the polarization-sensitive beam splitters 24 and 34 via the fibres 45 and 46 and the lenses 25 and 35. Each beam splitter supplies two linearly and orthogonally polarized sub-beams which are guided to the opto-electric converters 71, 73, 74 and 72 via the lenses 26, 27, 36 and 37 and the fibres 61, 63, 64 and 62. The electric output signals from the converters are further processed in a manner identical to that in the device according to FIG. 1. As compared with the receiver of FIG. 1, the receiver of FIG. 2 has one fibre-optic coupler less.

The two receivers shown have the drawback of the presence, of at the fibre-optic couplers and the connection fibres, of the so-called pigtails connected thereto. The pigtails are several dozen centimeters long and cannot be curled in sharp bends. Consequently, such a heterodyne detection device occupies a fairly large space and a typically linear dimension is approximately 20 centimeters.

Figure 3:
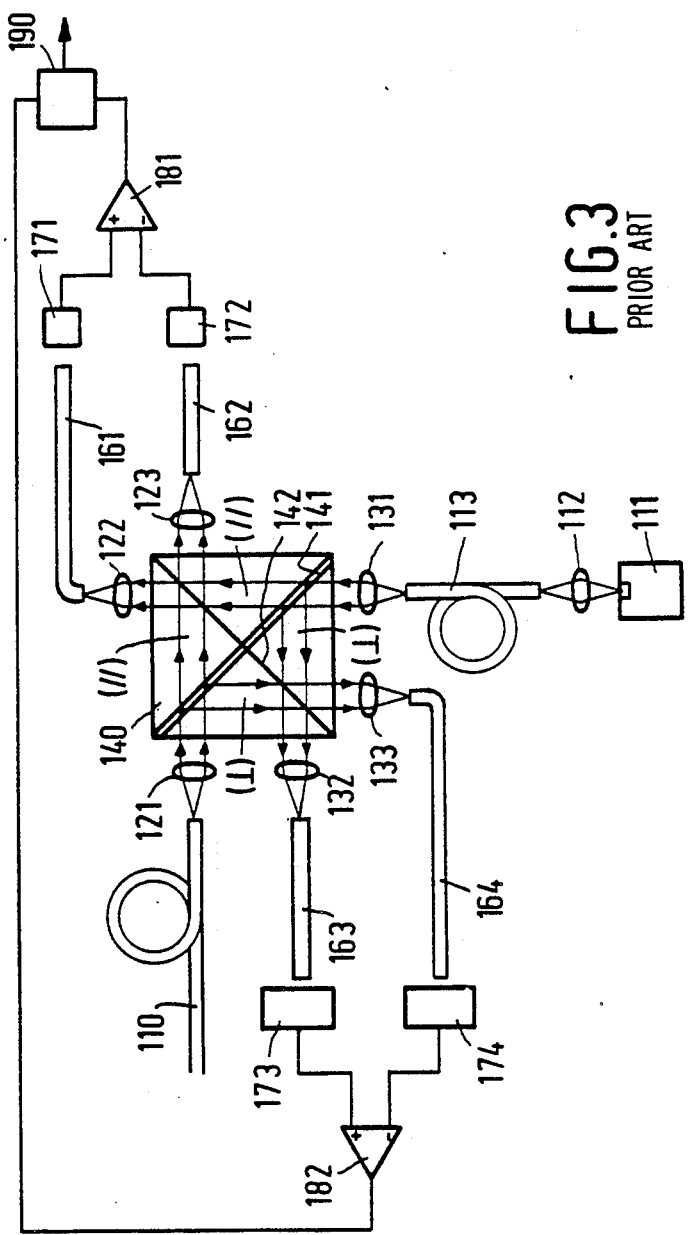
FIG. 3 shows a first embodiment of the receiver according to the invention.

FIG. 3 shows a first embodiment of the receiver for optical heterodyne detection according to the invention. The polarization-senitive beam splitters and the fibre-optic couplers are united in a single integrated optical component 140. This component comprises two planes 141 and 142 extending at right angles to each other. A polarization-sensitive beam-splitting layer is arranged in the plane 141, a beam-splitting layer which is not polarization-sensitive is arranged in the plane 142. The signal beam is applied from the transmission fibre 110 to the component via the lens 121. Analogously, the local oscillator beam is applied to the component from the local oscillator 111, via the lens 112, the fibre 113 and the lens 131. Both beams are split into two sub-beams having a mutually perpendicular direction of polarization by the beam-splitting layer in the plane 141. This is indicated in the Figure by means of the symbols ($||$) and ($\perp$), the direction of polarization of the beams going straight on being referred to as the parallel direction ($||$) and the direction of polarization of the beams reflected on the plane 141 being referred to as the perpendicular direction ($\perp$). The two sub-beams with a parallel direction of polarization are each split at the same position in the plane 142 by the polarization-insensitive beam splitter, the part of the signal beam going straigt on coinciding with the reflected part of the local oscillator beam, and the part of the local oscillator beam going straight on coinciding with the reflected part of the signal beam. The polarization-insensitive beam-splitting layer thus functions as a beam-combining element. The two resultant combined parallel polarized sub-beams are respectively applied to the opto-electric converters 171 and 172 via the lenses 122 and 123 and the fibres 161 and 162. Analogously, the perpendicularly polarized sub-beams of the local oscillator beam and the two resultant combined perpendicularly polarized sub-beams the signal beam are combined and are respectively guided to the opto-electric converters 173 and 174 via the lenses 132 and 133 and the fibres 163 and 164. The electric output signals of the opto-electric converters are processed by means of the differential amplifiers 181 and 182 and the combination circuit 190 in a manner which is identical to that described with reference to FIG. 1.

Figure 4:
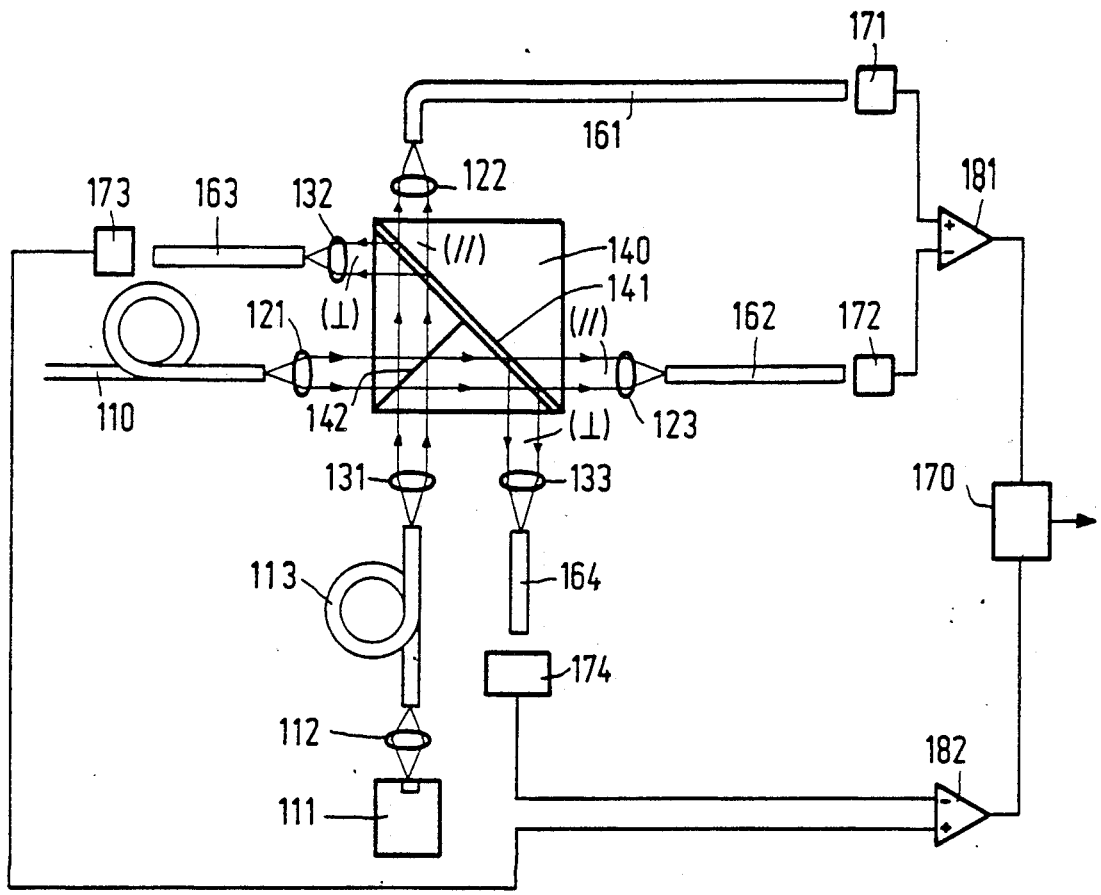
FIG. 4 shows a second embodiment.

FIG. 4 shows a second embodiment of a receiver according to the invention. In this embodiment the signal beam and the local oscillator beam are presented to the optical component 140 in such a way that these beams are incident at the same position on the plane 142 with the polarization-insensitive beam-splitting layer and are subsequently split by the polarization sensitive plane 141 into orthogonally polarized sub-beams.

Both the local oscillator beam and the signal beam are split in the plane 142 into a part going straight on and a reflected part. The part of the signal beam going straight on coincides with the reflected part of the local oscillator beam, and the reflected part of the signal beam coincides with the part of the local oscillator beam going straight on. The linearly polarized sub-beams from the polarization-sensitive beam-splitting layer in the plane 141 are further guided to the opto-electric converters 171, 172, 173 and 174 via the lenses 122, 123, 132 and 133 and the fibres 161, 162, 163 and 164, respectively. The electric output signals of these opto-electric converters are converted into an electric output signal, which is suitable for further processing, via the differential amplifiers 181 and 182 and the combination circuit 170.

The advantage of this embodiment over that of FIG. 3 is that radiation from the signal beam only need coincide with radiation from the local oscillator at one position in the plane 142 within the optical component. Aligning the beams relative to the optical component and relative to one another is thus simpler. Furthermore, this embodiment has the advantage that the polarization-insensitive beam splitter need only be arranged on one side of the plane 141. Consequently, the optical component can be composed of only three parts, which simplifies the production of the component and thus renders it less expensive.

Figure 5:
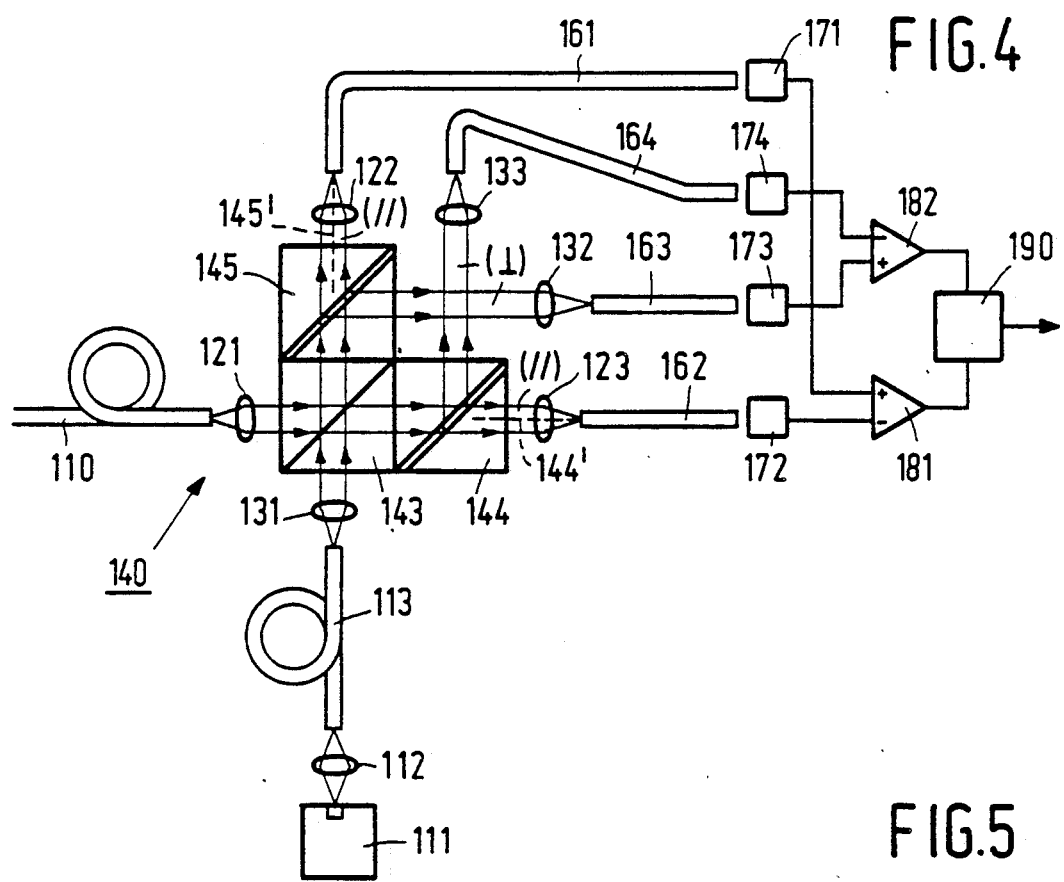
FIG. 5 shows a third embodiment.

FIG. 5 shows a third embodiment of a receiver for heterodyne detection of the signal beam according to the invention. In this embodiment the optical component 140 can be considered to be composed of three beam splitters 143, 144 and 145. The base plane of each beam splitter has a square shape and each beam splitter is composed of two triangular prisms having a right apex angle, with the oblique sides of the prisms being placed against one another. A beam-splitting layer is present between the two triangles. In the input beam splitter 143 this layer is not polarization-sensitive and in the two output beam splitters 144 and 145 such layer is a polarization-sensitive beam-splitting layer. The beam-splitting layers of the three beam splitters are arranged parallel to one another. Otherwise this embodiment is identical to the embodiment described with reference to FIG. 4. Comparable components have the same reference symbols and the operation of the device will be clear after reading the description of the previous embodiments and will therefore not be repeated here.

This embodiment has the advantage that no other optical fibres are coupled on the sides of the optical component 140 where the local oscillator beam and the signal beam are coupled. This simplifies the alignment of the input beams. This advantage becomes particularly manifest in an experimental situation in which the results of different types of couplings are evaluated, which couplings are provided one after the other, or in another situation in which repeated change of connections is required.

It is to be noted that the orientation of the beam splitters 144 and 145 can be chosen arbitrarily around an axis 144', or 145', respectively, which coincides with the chief ray of the signal beam or the local oscillator beam.

Figure 6A:
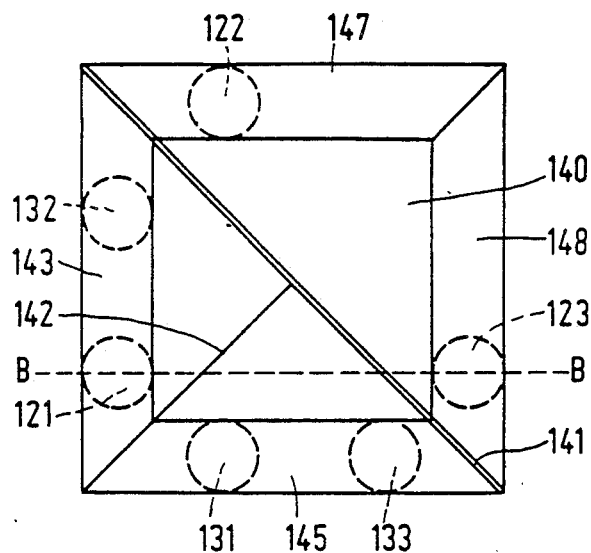
FIGS. 6a and 6b show embodiments of an optical component with reflecting faces in the radiation paths of the entrance and exit beams.

FIG. 6a shows an embodiment in which the integrated optical component 140 has reflecting faces for deflecting the entrance and exit beams. The embodiment shown is a modification of the embodiment already shown in FIG. 4 and which is described in greater detail with reference to this Figure. Only those components which are modified are shown in FIG. 6.

Similarly as in FIG. 4, the optical component 140 comprises a polarization-sensitive beam-splitting layer 141 and a polarization-insensitive layer 142. The sides of the component 140 are beveled at an angle of 45° so that each of the four sides comprises a reflecting face 143, 145, 147 or 148. These reflecting faces enable the entrance and exit radiation beams to be reflected on these faces before and after they are combined and split by the beam-splitting layers 141 and 142. In the plan view shown in FIG. 6a the positions of the entrance and exit beams are indicated by means of the broken-line circles 121, 131, 122, 123, 132 and 133.

Figure 6B:
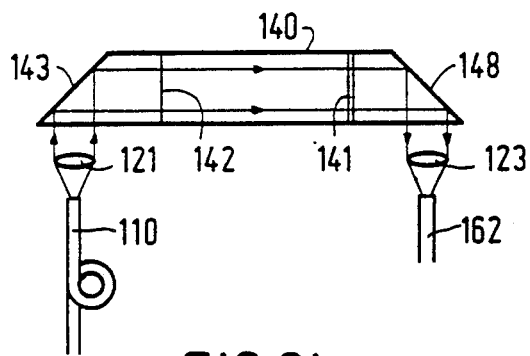

FIG. 6b is a side elevation of a cross-section of the optical component taken on the line B—B. The signal beam is radiated from the fibre 110 into the component 140 via the collimator lens 121. In this component the beam reflects on the face 143, traverses the polarization-insensitive beam splitter 142 in which it is combined with a part of the local oscillator radiation, is split into orthogonally polarized sub-beams by the polarization-sensitive beam-splitting layer 142 while one of the sub-beams is passed to a detector via the reflecting face 148 and the lens 123 in the waveguide 162.

Figure 7C:
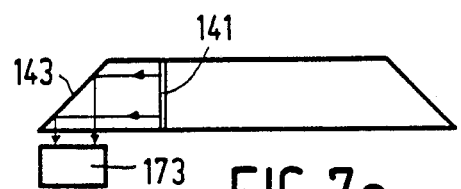
FIGS. 7a, 7b and 7c show alternative embodiments.
Figure 7A:
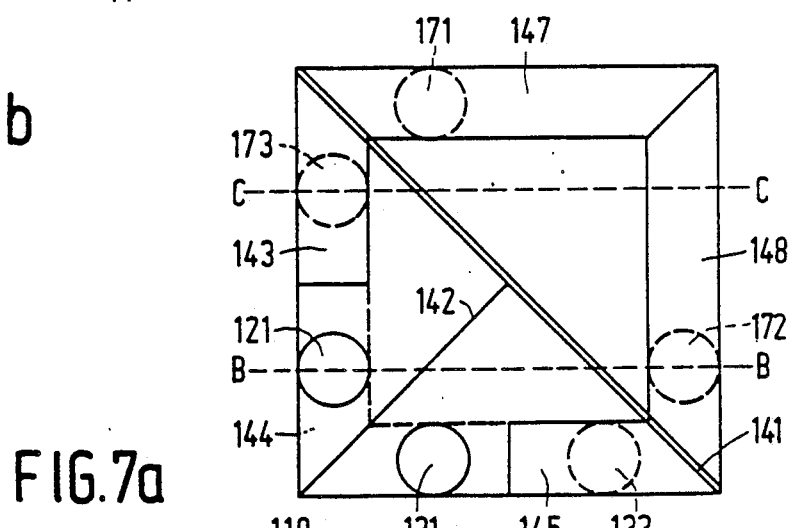
Figure 7B:
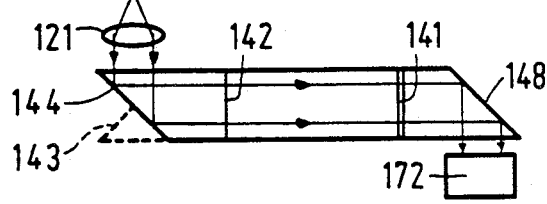
Figure 8:
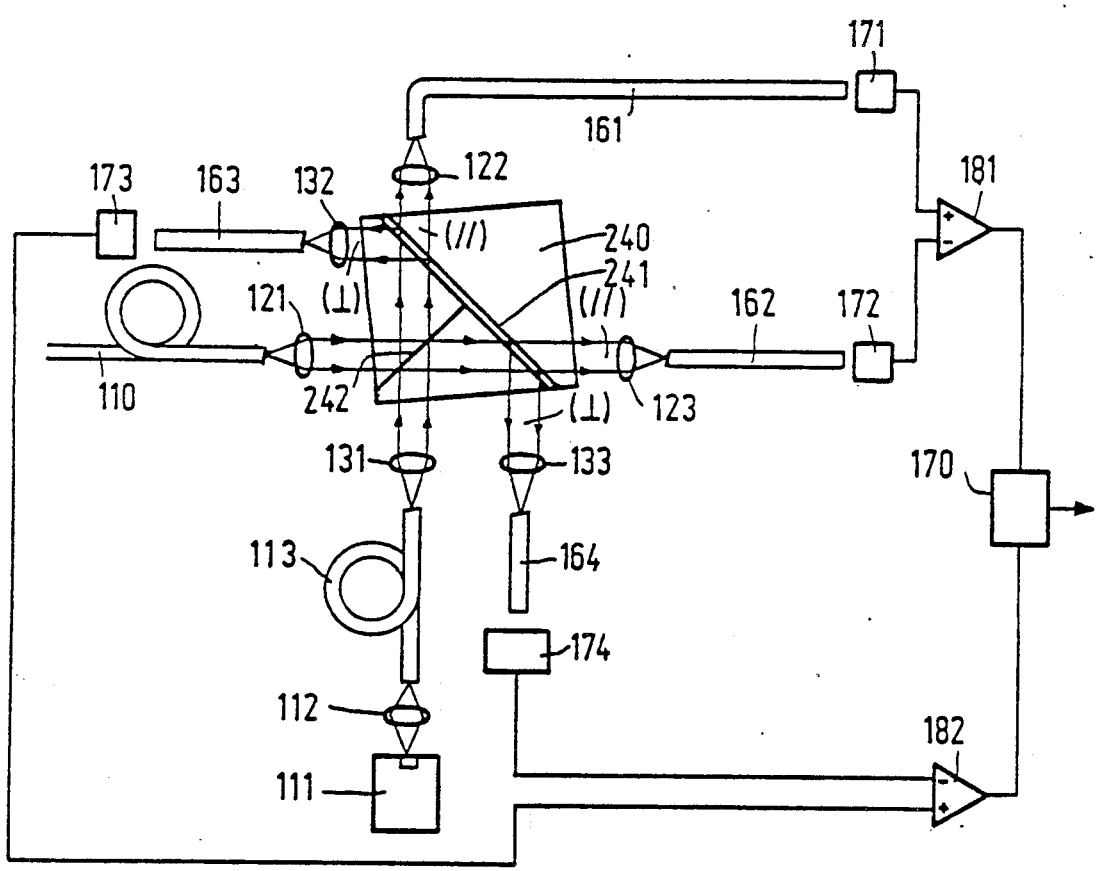
FIG. 8 shows an embodiment in which the disturbing influence of reflections is reduced to a maximum possible extent.

FIGS. 7a, 7b and 7c show other embodiments of an integrated optical component according to the invention. Identical reference numerals denote comparable components of FIG. 6. In contrast to the embodiment shown in FIG. 6a the entrance beams are incident from the upper side, whereas the exit beams emerge at the lower side. In this way the lower side can be entirely used for providing the means to capture the exiting radiation beams, for example by arranging the radiation-sensitive detectors directly on the lower side.

FIGS. 7b and 7c are side elevations of cross-sections taken on the lines B—B and C—C. In FIG. 7b the signal beam enters via the waveguide 110 and the collimator lens 121. The beam is reflected on the face 144, traverses the beam-splitting layers 142 and 141 and is reflected via the face 148 to the detector 172 which is arranged directly on the lower side of the component 140. FIG. 7c shows a beam which is incident on the detector 173 via the polarization-sensitive beam-splitting layer 142 and the reflecting face 143.

To reduce radiation losses at the air-glass interfaces of the optical component, and particularly to prevent disturbing reflections on these surfaces, the entrance and exit faces of the optical component have anti-reflection coatings. However, an anti-reflection coating only is not always sufficient to prevent any disturbing influence of reflected light. According to the invention the entrance and exit faces of the optical component are arranged obliquely so that the normal of the faces extends at an angle of approximately 1° to the direction of the radiation beam passing therethrough. This is shown diagrammatically in FIG. 6. FIG. 6 is largely identical to FIG. 4, with the exception of the optical component and the ends of the optical waveguides. Reference is made to FIG. 4 for a description of the elements which are not explained below. The optical component 240 has entrance and exit faces whose normal extends at an angle of approximately 1° to the direction of the radiation beams passing therethrough. However, the polarization-sensitive beam-splitting layer 242 and the neutral beam-splitting layer 241 have the same position with respect to the radiation beams as the corresponding faces 142 and 141 in FIG. 4. Since the entrance and exit faces are arranged obliquely, radiation reflected thereon is not captured in the waveguides and thus does not have any disturbing influence on the detection system. Since the disturbing influence of the reflections is eliminated in this way, it is not necessary to provide a high-grade anti-reflection coating on the faces of the component 240. It will be sufficient to provide an anti-reflection coating which has a residual reflection of approximately 0.5%.

The minimum angle of obliqueness of the side faces of the optical component 240 depends on the distance to and the diameter of the waveguides and is in the range of several tenths of degrees to several degrees. Also the end faces of the waveguides 110, 113, 161, 162, 163 and 164 may be arranged obliquely with respect to the direction of the radiation beam. For a further description thereof reference is made to the above-mentioned contribution by C. K. Wong et al. to ECOC 88 held at Brighton in Sept. 1988.

I claim:

1. A receiver for optical heterodyne or homodyne detection of an optical signal beam, comprising: a local oscillator for producing a beam of radiation; at least one beam splitter for splitting the signal beam into two orthogonally polarized components; at least one beam-combining element for combining radiation from the signal beam with radiation from the local oscillator beam; and a detection system for converting the combined radiation into at least one electrical signal suitable for further processing; characterized in that said beam splitter is polarization-sensitive and said beam-combining element is polarization-insensitive, and said beam splitter and said beam-combining element are respective planar layers of a single constructively integrated optical component.

2. A receiver as claimed in claim 1, characterized in that said polarization-sensitive beam-splitting layer is in a first plane of said integrated optical component and said polarization-insensitive beam-combining layer is in a second plane of said integrated optical component, the first and second planes extending substantially at right angles to each other.

3. A receiver as claimed in claim 2, characterized in that said polarization-insensitive beam-splitting layer extends in said second plane up to but without crossing said first plane.

4. A receiver as claimed in claim 3, characterized in that said integrated optical component has at least one reflecting face arranged in the light path of a radiation beam entering or exiting such component for deflecting said beam.

5. A receiver as claimed in claim 4, characterized in that the said reflecting face extends at an angle of approximately 45° to the direction of the portion of said light path which is within said integrated optical component.

6. A receiver as claimed in claim 3, characterized in that said integrated optical component has at least one planar face arranged in the light path of a beam of radiation entering or exiting such component through said face, the normal to said face beng at an angle to said light path which is in the range from several tenths of a degree to several degrees.

7. A receiver as claimed in claim 2, characterized in that said integrated optical component has at least one reflecting face arranged in the light path of a radiation beam entering or exiting such component for deflecting said beam.

8. A receiver as claimed in claim 7, characterized in that the said reflecting face extends at an angle of approximately 45° to said light path.

9. A receiver as claimed in claim 8, characterized in that the said reflecting face extends at an angle of apprximately 45° to the direction of the portion of said light path which is within said integrated optical component.

10. A receiver as claimed in claim 7, characterized in that the said reflecting face extends at an angle of approximately 45° to the direction of the portion of said light path which is within said integrated optical component.

11. A receiver as claimed in claim 2, characterized in that said integrated optical component has at least one reflecting face arranged in the light path of a radiation beam entering such component from a first direction for deflecting such entering beam, and at least one reflecting face arranged in the light path of a beam of radiation exiting such component for deflecting such exiting beam in a second direction; said first and second directions being diametrically opposed.

12. A receiver as claimed in claim 11, characterized in that the said reflecting face extends at an angle of approximately 45° to said light path.

13. A receiver as claimed in claim 12, characterized in that the said reflecting face extends at an angle of approximately 45° to the direction of the portion of said light path which is within said integrated optical component.

14. A receiver as claimed in claim 2, characterized in that said integrated optical component has at least one planar face arranged in the light path of a beam of radiation entering or exiting such component through said face, the normal to said face being at an angle of said light path which is in the range from several tenths of a degree to several degrees.

15. A receiver as claimed in claim 1, characterized in that it comprises two polarization-sensitive beam-splitter which are polarization-sensitive planar layers in respective planes of said integrated optical components; and one beam-combining element which is a polarization-insensitive planar layer in another plane of said integrated optical component; said planes being parallel to one another.

16. A receiver as claimed in claim 15, characterized in that said integrated optical component has at least one reflecting face arranged in the light path of a radiation beam entering or exiting such component for deflecting said beam.

17. A receiver as claimed in claim 16, characterized in that the said reflecting face extends at an angle of approximately 45° to said light path.

18. A receiver as claimed in claim 17, characterized in that the said reflecting face extends at an angle of approximately 45° to the direction of the portion of said light path which is within said integrated optical component.

19. A receiver as claimed in claim 16, characterized in that the said reflecting face extends at an angle of approximately 45° to the direction of the portion of said light path which is within said integrated optical component.

20. A receiver as claimed in claim 15, characterized in that said integrated optical component has at least one planar face arranged in the light path of a beam of radiation entering or exiting such component through said face, the normal to said face being at an angle to said light path which is in the range from several tenths of a degree to several degrees.

21. A receiver as claimed in claim 1, characterized in that said integrated optical component has at least one planar face arranged in the light path of a beam of radiation entering or exiting from such component through said face, the normal to said face being at an angle to said light path which is in the range from several tenths of a degree to several degrees.

22. An integrated optical component suitable for use in a receiver as claimed in claim 1.

* * * * *